United States Patent [19]

Lecerf et al.

[11] Patent Number: 4,980,080

[45] Date of Patent: Dec. 25, 1990

[54] PROCESS OF MAKING A CATHODE MATERIAL FOR A SECONDARY BATTERY INCLUDING A LITHIUM ANODE AND APPLICATION OF SAID MATERIAL

[75] Inventors: André Lecerf, Pacé, France; Michel Broussely, Liguge; Jean-Paul Gabano, Poitiers, all of France

[73] Assignee: Societe Anonyme dite: SAFT, Poitiers, France

[21] Appl. No.: 359,333

[22] Filed: May 31, 1989

[30] Foreign Application Priority Data

Jun. 9, 1988 [FR] France .................... 88 07697
Jun. 9, 1988 [FR] France .................... 88 07698

[51] Int. Cl.$^5$ ............................................. H01M 4/04
[52] U.S. Cl. .................................. 252/182.1; 429/223
[58] Field of Search ............... 429/194, 197, 218, 223; 252/182.1

[56] References Cited

U.S. PATENT DOCUMENTS 4,721,513 1/1988 Smith et al. .................. 429/223
4,770,960 9/1988 Nagaura et al. ................ 429/218

Primary Examiner—Donald L. Walton
Attorney, Agent, or Firm—Kenyon & Kenyon

[57] ABSTRACT

A process of making a cathode material for a secondary battery including a lithium anode and application of said material.

A process of making a cathode material for a secondary electrochemical battery including a lithium anode, wherein said material corresponds to one of the formulas $Li_yNi_{2-y}O_2$ or $LiNi_{1-x}Co_xO_2$, wherein y is a number ranging from 0.84 to 1.22 and x is a number ranging from 0.09 to 0.5, wherein the base is lithium hydroxide, nickel oxide or possibly cobalt oxide, in a powdered form in the desired stoichiometric ratio, and wherein it is heated in air at a temperature ranging from approximately 600° C. to 800° C.

4 Claims, 10 Drawing Sheets

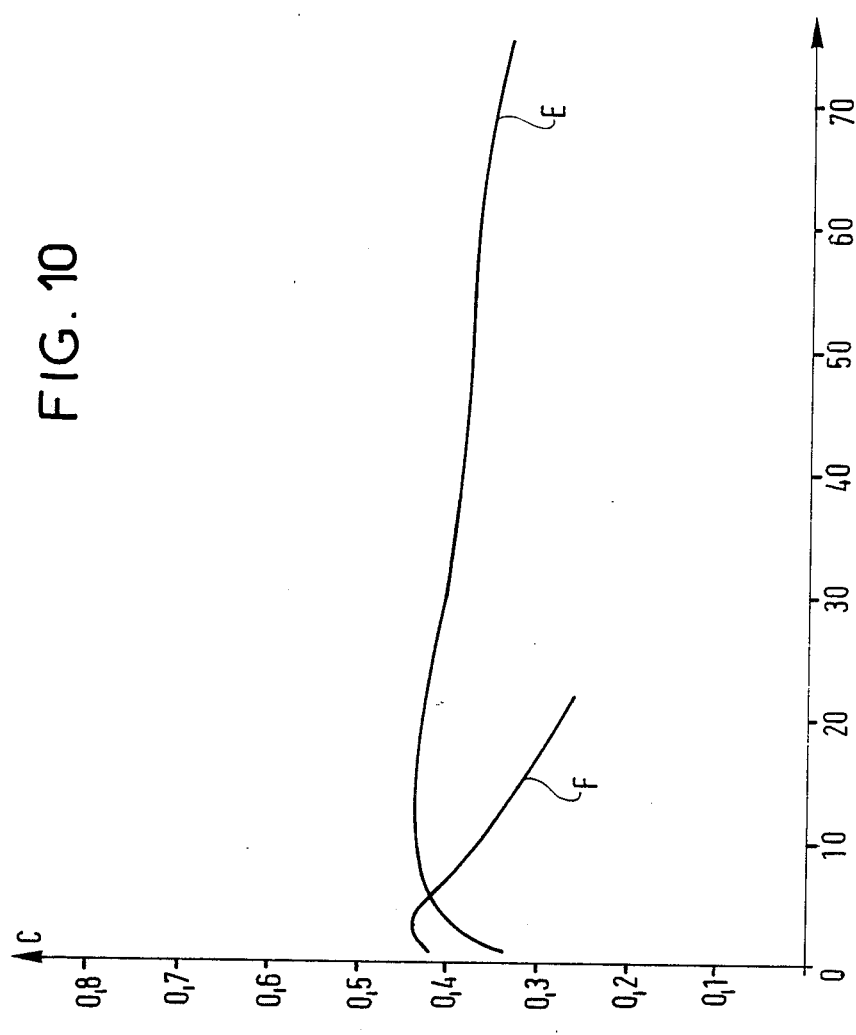

PROCESS OF MAKING A CATHODE MATERIAL FOR A SECONDARY BATTERY INCLUDING A LITHIUM ANODE AND APPLICATION OF SAID MATERIAL

This invention relates to a process of making a cathode material for a secondary battery including a lithium anode and an application of said material.

In the field of rechargeable electrochemical lithium batteries, the use of cathode materials such as $MoS_2$, $TiS_2$, $V_2O_5$ and $LiCoO_2$ is known. The specific energies of these materials are, respectively, on the order of 241 Wh/kg, 502 Wh/kg, 471 Wh/kg and 688 Wh/kg.

It is also known that materials corresponding to formulas of the type $Li_yNi_{2-y}O_2$ and $LiNi_{1-x}Co_xO_2$ are likely to display very high specific energies.

A number of articles have proposed methods of synthesizing this type of material.

In the article by L. D. Dyer, B. S. Boric and G. P. Smith published in *J. Amer. Chem. Soc.* 73, 2452 (1951), $LiNiO_2$ is obtained by oxidation, under an oxygen current, of metallic nickel immersed in LiOH melted at 800°C. The reaction time is 24 hours.

In the article by N. Bronger, H. Bode and W. Klemm, in *Z. Anorg. Allg. Chem.* 285, 322 (1956), the reaction of nickel oxide NiO and lithium oxide $Li_2O$ at 750°C. under a dry oxygen current is used to produce $LiNiO_2$.

The first method of synthesis can be used to produce only small quantities of the material.

The second method employs lithium oxide $Li_2O$ which is not readily available.

The object of this invention is therefore to propose a process of making the above cited compounds, which is simplified when compared to methods described in the prior art.

The object of this invention is a process of making a cathode material for a secondary electrochemical battery including a lithium anode, wherein said material corresponds to one of the formulas $Li_yNi_{2-y}O_2$ and $LiNi_{1-x}Co_xO_2$, wherein y is a number ranging from 0.84 to 1.22 and x is a number ranging from 0.09 to 0.5, wherein the starting materials are a mixture of lithium hydroxide and nickel oxide or cobalt oxide in powdered form, in the desired stoichiometric ratio, and wherein the mixture is heated in air at a temperature ranging from approximately 600°C. to 800°C.

To accelerate the process, the mixture is first heated in air, it is rehomogenized and heated a second time in air; the heating temperature ranges from approximately 600°C. to 800°C. and the heating period ranges from 1 hour to several hours depending on the temperature and on the quantities of product employed.

The process is conducted entirely in air, it does not require a pure oxygen atmosphere, and an ordinary muffle furnace may be employed.

The basic products are readily available. Preferably, hydrated lithium hydroxide LiOH, $H_2O$, which is the commercial form of the product, is employed.

According to a preferred method, homogenization is performed by grinding.

A further object of this invention is a cathode for a rechargeable electrochemical lithium battery which employs the materials produced according to the foregoing process.

Other characteristics and advantages of this invention shall be made apparent in the following description of examples of several embodiments which are provided for purposes of illustration and are not to be construed as limiting examples.

In the appended drawing:

FIG. 10 shows the evolution of the capacity of a battery using the material $LiNi_{0.91}Co_{0.09}O_2$ according to the invention as a function of the number of cycles (curve E), compared to that of a prior art battery (curve F).

EXAMPLE I

Figure 1:
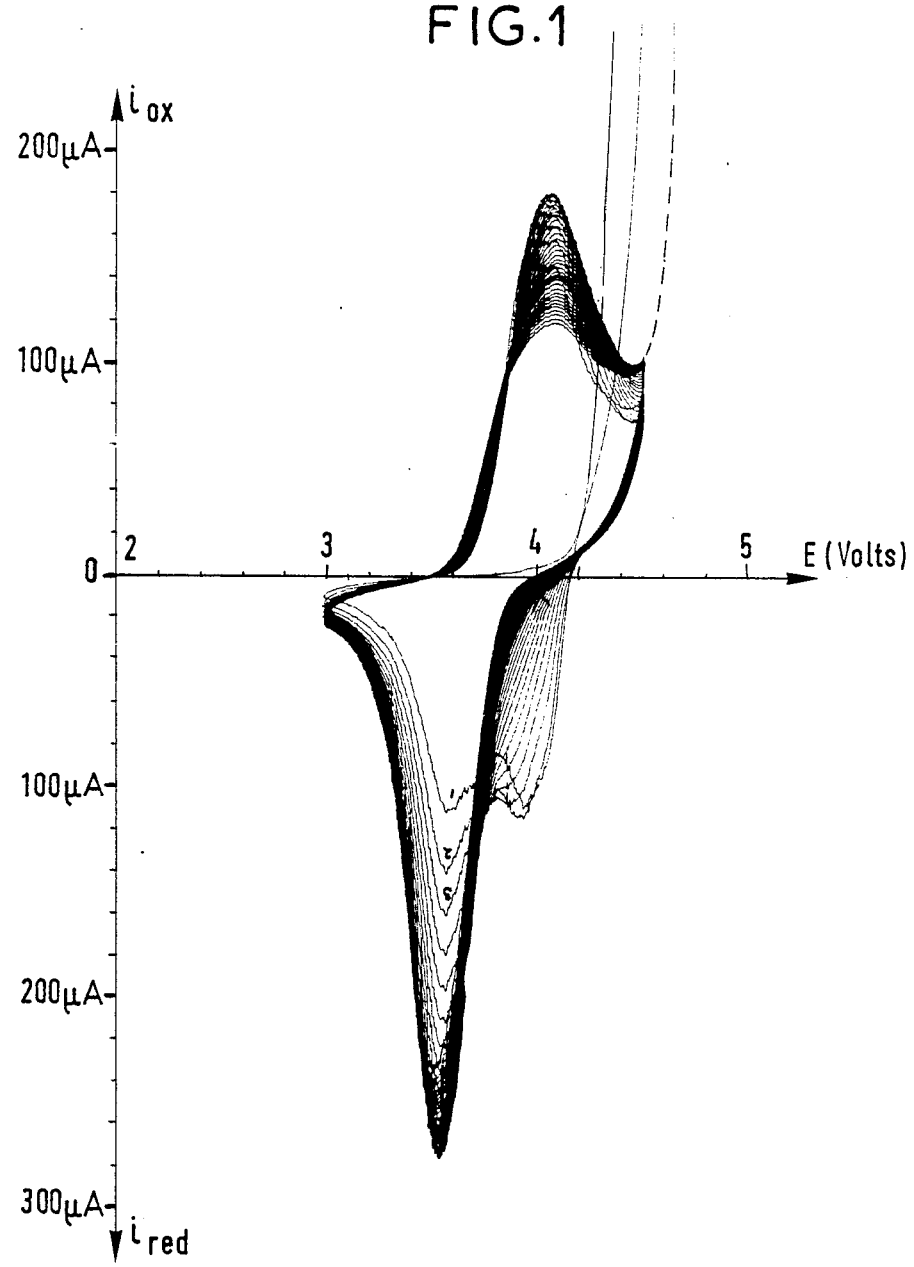
FIG. 1 is an intensity/potential diagram which demonstrates the reversibility of a cathode material of the $Li_yNi_{2-y}O_2$ type according to the invention.

A cathode material of the $Li_yNi_{2-y}O_2$ type according to the invention is first prepared using the process described below:

One mole of NiO, or 74.71 g, is mixed with one mole, or 41.96 g of lithine, $LiOH H_2O$. The mixture is placed in a ball grinder for one hour, then placed in a silica-alumina refractory (refractory clay) crucible. The crucible is heated at 700°C. in air in a muffle furnace. At the end of one hour, the crucible is removed from the furnace. The mixture is again ground for one hour, replaced in the crucible, then heated at 700°C. in air for 4 hours. At the end of 4 hours, the crucible is removed from the furnace and the material allowed to cool quickly.

After grinding, the resulting solid was subjected to chemical analysis and X-ray diffraction analysis.

The lithium, nickel and nickel oxidation number n were titrated through chemical analysis. Indeed, in the $LiNiO_2$ phase, the nickel oxidation number is not quite 3. It is frequently less than 3, which corresponds to the presence of a small amount of $Ni^{2+}$ next to $Ni^{3+}$.

Table 1 summarizes the results obtained.

TABLE I

| | Li % | Ni % | n |
|---|---|---|---|
| Value obtained | 6.35 | 60.1 | 2.87 |
| Value calculated for LiNiO | 7.11 | 60.11 | 3 |

The percentage of lithium, which is less than the calculated value, is explained by some volatilization during the heating process. The lithium deficiency may be corrected by using a slight excess of lithine at the outset.

In Table II, the reticular distances and the intensities of the X-ray diffraction rays observed are compared to the values of J.C.P.D.S. data sheet no. 9-63 for $LiNiO_2$; h, k, l are the Miller indices which define the crystallographic planes of the material.

TABLE II

| h k l | Data Sheet 9-63 | | Material of the invention | |
|---|---|---|---|---|
| | d Å | I | d Å | I |
| 003 | 4.72 | 100 | 4.72 | 100 |
| 101 | 2.45 | 40 | 2.45 | 40 |
| 006 | 2.36 | 12 | 2.36 | 6 |
| 012 | 2.35 | 15 | 2.35 | 16 |
| 104 | 2.04 | 95 | 2.04 | 73 |
| 015 | 1.862 | 11 | 1.873 | 11 |
| 107 | 1.570 | 20 | 1.575 | 9 |

This X-ray diffraction spectrum of the material obtained by the process of the invention thus shows that the phase present is composed essentially of $LiNiO_2$.

The electrochemical properties of this cathode material were then determined using two conventional electrochemistry techniques, that is, cyclic voltammetry and fixed current coulometric analysis, the principles of which shall be recalled below.

In both instances, the cathode material to be analyzed is deposited on a metal collector such that it forms an electrode. This collector is selected such that, in the range of potential under observation, which corresponds to the oxidation and reduction ranges of the material of the invention, the metal does not affect the electrochemical reaction and, more particularly, it is not oxidized.

In the embodiments described in the following, the metal selected is aluminum; however, other metals such as titanium, for example, may also be employed.

The material is deposited on the electrode such that a proper transfer of electrons occurs between this metal and the metal base. This transfer is assured by the addition of graphite. In order to ensure that the material adheres properly to the base, which is a prerequisite for proper operation, it is essential to add a binder. In the examples which follow, the binder is carboxymethyl cellulose.

For the electrochemical analysis of the electrode of the cathode material produced in this manner, a couple is formed with a lithium anode. These two electrodes are immersed in an appropriate electrolytic medium and electrically insulated from each other by a separator. The electrolytic medium must display the following properties: It must be non-aqueous, be stable with respect to both electrodes (anode and cathode), dissolve in a lithium salt to ensure sufficient ionic conductivity ($> 10^{-3} \Omega^{-1} cm^{-1}$), and not cause secondary oxidation or reduction reactions, which may be detrimental to the operation of the battery formed in this manner. For these reasons, it will be selected from among the group of solvents known as aprotic solvents which are resistant to oxidation, such as esters, sulfones and nitriles.

In the following examples, the solvent employed is dimethyl carbonate.

A combination of several solvents may also be employed, as extensively described and applied in batteries having lithium anodes as disclosed in French Pat. No. 2,378,361.

Such a combination may produce synergetic effects by combining complementary properties.

The solute is a lithium salt, selected from among the conventional solutes for batteries having a lithium anode, and, in order of preference: $LiAsF_6$, $LiBF_4$, $LiClO_4$, $LiCF_3SO_3$, $LiPF_6$, used alone or in mixtures.

Using the compound obtained in the manner described above, a first electrode is prepared as follows: a composition is prepared of 0.5 g of a mixture containing 10 weight percent $LiNiO_2$ according to the invention, 89 weight percent graphite and 1 weight percent carboxymethyl cellulose; this mixture is dispersed in 2.5 g of water.

A 23.2 mg mass of this composition is deposited on an aluminum plate measuring 1 $cm^2$. After evaporating the water at 45°C., a mass of 3.9 mg of dry mixture is obtained.

This electrode is immersed in a solution of 2M $LiAsF_6$ in dimethyl carbonate (DMC) opposite a lithium electrode weighing approximately 120 mg and having an area of 2.5 $cm^2$.

Another lithium electrode is immersed in the solution, in proximity to the cathode, the potential of which will be used as a reference for measuring the electromotive force of the lithium/cathode material couple. Because the electrodes are isolated from each other in the solution, a separator is not needed.

Once the cell has been made in this manner, the experiment consists of applying a controlled potential to the cathode, which is measured relative to the reference electrode, and recording the oxidation or reduction current which passes through it. The controlled potential varies in a linear manner as a function of time at the rate of 30 mV/minute, between predetermined limits.

FIG. 2 illustrates the resulting intensity/potential diagram. The potential E (in volts) of the cathode, measured relative to the reference lithium electrode, is shown along the x-axis; the oxidation current $i_{ox}$ ($\mu A$) and the reduction current $i_{red}$ ($\mu A$) passing through the cathode is shown along the y-axis. The reference numbers indicate the number of the corresponding cycle.

The diagram clearly illustrates that the cathode under observation is reversible, according to the reaction:

$$LiNiO_2 \rightleftharpoons Li_{1-x}NiO_2 + xLi^+ + xe^-$$

The oxidation range of the material lies between 3.5 and 4.5V and the reduction range between 4.2 and 3V.

The formation of the electrode is observed during the initial cycles. The first electrochemical reaction is oxidation, because the initial material is in the reduced state, according to the equation described above. The oxidation potential of the first cycle is in effect greater than that which occurs during subsequent cycles.

The maximum currents of the oxidation and reduction peaks are, respectively, 180 $\mu A$ and 270 $\mu A$.

For thin electrodes of this type, containing a small quantity of active material, the current may be related to the total quantity of material, which is assumed to react at the same moment. The following specific maximum currents are thus obtained:

$j_{ox} = 464$ mA/g and $j_{red} = 692$ mA/g.

In the following example of an embodiment of a cathode material according to the invention, an experimental rechargeable battery is made by placing a cathode of the same type as that described in the foregoing, but containing a higher proportion of active material, or (in percentages by weight):

| | |
|---|---|
| LiNiO$_2$ | 30% |
| graphite | 69% |
| carboxymethyl cellulose | 1%, |

0.5 g of this mixture is dispersed in 2.5 g of water.

A sufficient quantity of the mixture is deposited on an aluminum electrode of 1 cm$^2$ to produce a 14.3 mg deposit of dry material, or 4.3 mg of active material, or $4.4 \cdot 10^{-3}$ moles.

This electrode is placed in the electrolyte opposite a lithium electrode and separated from the latter by a microporous polypropylene membrane having a thickness of 50 microns. The two electrodes are firmly held against the separator by two insulated plates which have no effect in the electrochemical reaction. This assembly is immersed in 5 ml of 2M LiAsF$_6$ electrolyte in dimethyl carbonate, within a hermetically sealed cell. Current outputs are provided to apply a current to the electrodes. A substantial quantity of lithium is present, in a capacity 500 times greater than the cathode capacity. It therefore does not limit the electrical properties of the battery.

The battery formed in this manner is exposed to charge/discharge cycles at an imposed, fixed current of 0.2 mA, at voltages V falling within predetermined limits:

Charge V$_{max}$ = 4.25 V

Discharge V$_{min}$ = 3 V

Figure 2A:
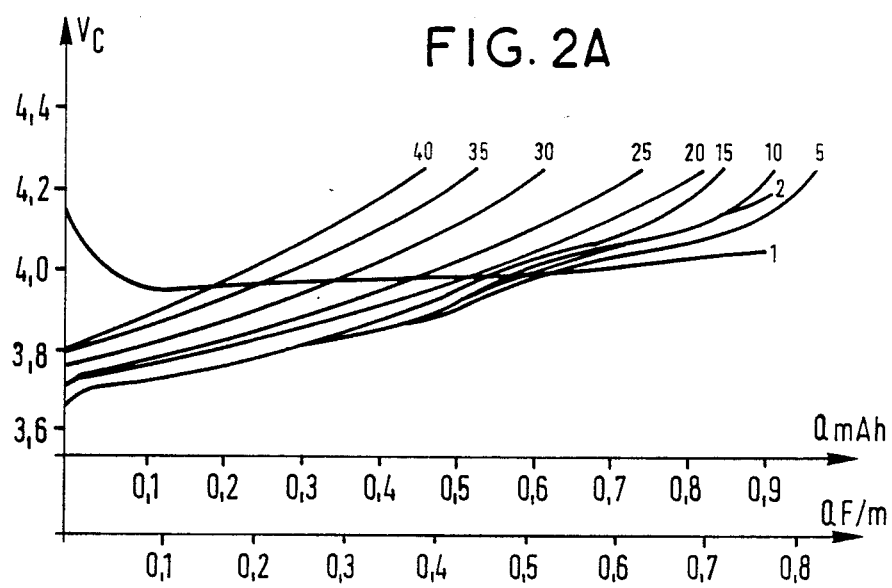
FIGS. 2a and 2b illustrate the evolution of the voltage (V charge, V discharge) of a battery using the foregoing material according to the invention during the course of cycling, as a function of the electric load applied.
Figure 2B:
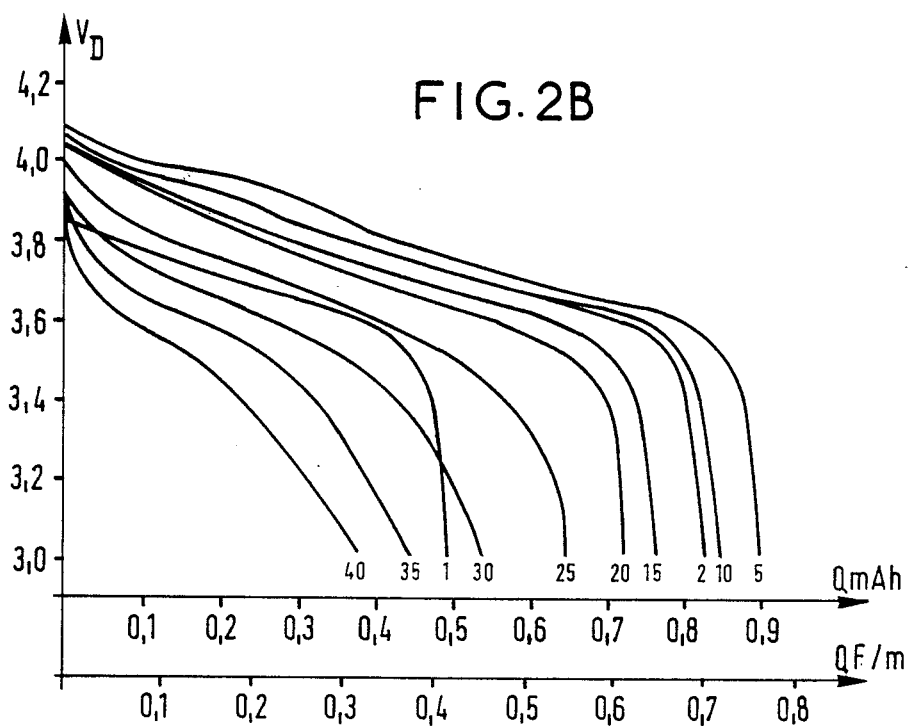

FIGS. 2a and 2b represent the voltage of the battery, in volts, which is recorded during cycling (V$_C$/charge, V$_D$/discharge), as a function of the electric load (Q) applied. This electric load is expressed in mAh and in Faradays/mole. The reference numbers indicate the number of the corresponding cycle.

Thus, it is calculated that, for the maximum capacity cycle (cycle No. 5), 0.77 Faraday per mole was exchanged, such that the reaction may be translated as:

LiNiO$_2$ ⇌ Li$_{0.23}$ NiO$_2$ + 0.77 Li$^+$ + 0.77e$^-$

During discharge, the reduction reaction is produced at an average voltage of 3.8 V, which results in a calculated specific energy released of 803 Wh/Kg, relative to the weight of the cathode material.

This value is far higher than the values mentioned earlier for cathode materials such as MoS$_2$, TiS$_2$ and V$_2$O$_5$.

Figure 3A:
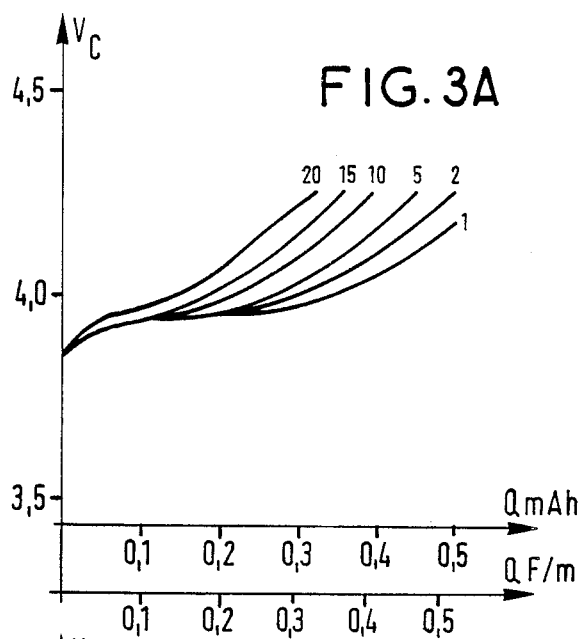
FIGS. 3a and 3b illustrate curves similar to those shown in FIGS. 2a and 2b for a battery of the prior art.
Figure 3B:
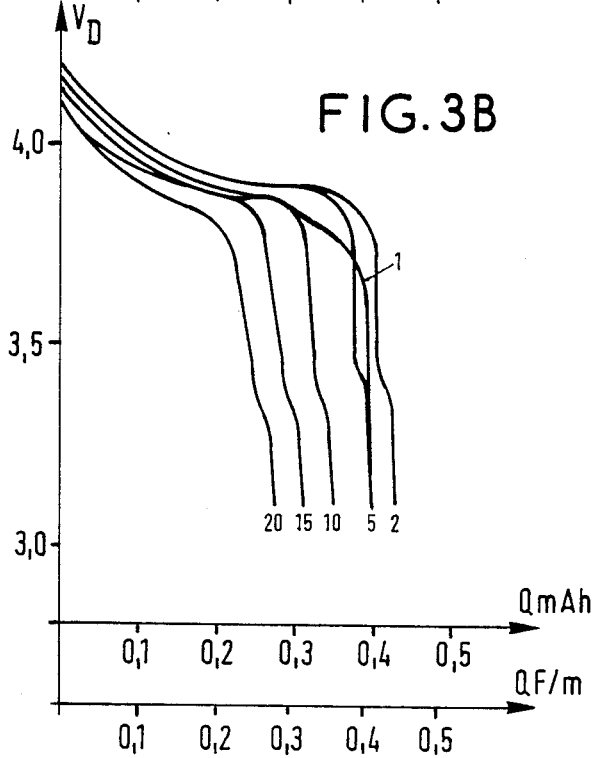

The performance of the material according to the invention was then compared with that of the known material LiCoO$_2$. For this purpose, an electrode containing 3.6 mg of LiCoO$_2$ was made in the same manner as the electrode according to the invention. Tests were performed under the same conditions as those which produced the curves of FIGS. 2a and 2b. The curves shown in FIGS. 3a and 3b were obtained.

The maximum number of Faradays/mole is 0.44, which results in a calculated specific energy of 471 Wh/Kg, based on an average voltage of 3.95 V. This value is far below the value obtained using the material according to the invention.

EXAMPLE II

A second sample of a cathode material of the LiNi$_{1-x}$Co$_x$O$_2$ type according to the invention is prepared by the following process:

One mole of NiO, or 74.71 g, is mixed with 0.05 mole of cobalt oxide Co$_2$O$_3$, or 8.29 g, and with 1.10 mole of LiOH H$_2$O, or 46.16 g, which corresponds to 0.91 mole percent Ni, 0.09 mole percent Co, 1 mole percent Li.

The mixture is ground for one hour, placed in a crucible and heated for one hour at 700°C. in air. The mixture removed from the furnace is ground a second time for one hour, replaced in the crucible, then heated at 700°C. in air. At the end of 4 hours, the crucible is removed from the furnace and allowed to cool rapidly.

The ground solid was chemically analyzed and examined using X-ray diffraction techniques.

The lithium, the sum of Ni+Co=M (by complexometric titration), and the degree of oxidation n of the metal were titrated. The results shown in Table III were obtained.

TABLE III

| | Li % | Ni % | n |
|---|---|---|---|
| Value obtained | 6.7 | 60.0 | 2.93 |
| Value calculated for LiMO | 7.11 | 60.11 | 3 |

The reticular distances d and the intensities of the diffraction rays I obtained by X-ray diffraction are provided below in Table IV; h, k, 1 are Miller indices which define the crystallographic planes of the material.

TABLE IV

| h k l | d Å | I |
|---|---|---|
| 003 | 4.69 | 100 |
| 101 | 2.44 | 37 |
| 006 | 2.34 | |
| 012 | 2.34 | 15 |
| 104 | 2.03 | 30 |
| 015 | 1.879 | 9 |
| 107 | 1.569 | 9 |

Figure 4:
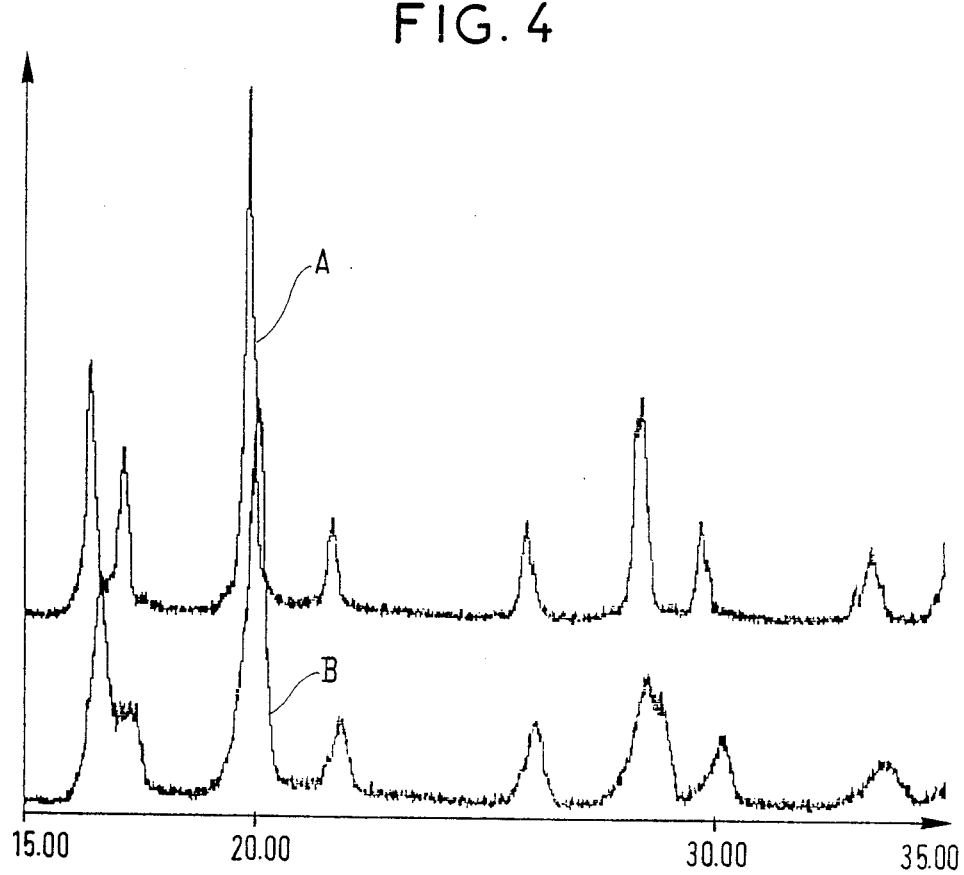
FIG. 4 shows the X-ray diffraction diagrams A and B of two materials of the $LiNi_{1-x}Co_xO_2$ type according to the invention.

The X-ray diffraction diagram (MoK) is shown in FIG. 4 (curve A).

Table V uses the same values for the material LiNiO$_2$, in accordance with J.C.P.D.S. data sheet No. 9-63.

TABLE V

| h k l | d Å | I |
|---|---|---|
| 003 | 4.72 | 100 |
| 101 | 2.45 | 40 |
| 006 | 2.36 | 12 |
| 012 | 2.35 | 15 |
| 104 | 2.04 | 95 |
| 015 | 1.862 | 11 |
| 107 | 1.570 | 20 |

It is apparent that the diagram obtained for the material according to the invention is quite similar to that of LiNiO$_2$. However, there are difference in the scattering and the intensity of the diffraction rays, which normally occurs when a solid solution is formed. The nickel was thus partially replaced by cobalt in LiNiO$_2$. Based on chemical analysis, the formula of this material may be written as Li$_{0.93}$Ni$_{0.91}$Co$_{0.09}$O$_2$, since the initial proportions of nickel and cobalt were 0.91 mole percent Ni and 0.09 mole percent Co.

EXAMPLE III

A third sample of the cathode material of the LiNi$_{1-x}$Co$_x$O$_2$ type according to the invention is prepared by mixing 0.75 mole or 56.03 g of NiO, 0.125 mole or 20.73 g of Co$_2$O$_3$, and one mole or 41.96 g of LiOH H$_2$O, which corresponds to 0.75 mole percent Ni, 0.25 mole percent Co, 1 mole percent Li.

The material was synthesized under the same conditions as those described in Example II.

Chemical analysis of the solid obtained yielded the results shown in Table VI.

TABLE VI

|  | Li % | M % | n |
|---|---|---|---|
| Value obtained |  | 60.3 | 2.93 |
| Value calculated for LiMO$_2$ | 7.11 | 60.11 | 3 |

The X-ray diffraction spectrum shown in FIG. 4 (curve B) shows that a poorly crystallized solid is obtained. Despite this poor crystallization, this spectrum clearly displays similarities to the spectrum of Li$_{0.93}$Ni$_{0.91}$CO$_{0.09}$O$_2$.

A second electrode is prepared in the following manner. 0.5 g of a mixture is prepared of 10 weight percent of the material according to the invention, LiNi$_{0.91}$CO$_{0.09}$O$_2$, 89 weight percent graphite and 1 weight percent carboxymethyl cellulose. This mixture is dispersed in 2.5 g of water.

A mass of 31 mg of this composition is deposited on an aluminum plate of 1 cm$^2$. After evaporation of the water at 45°C., a mass of 5.2 mg of the dry mixture is obtained.

This electrode is immersed in a solution of 2M LiAsF$_6$ in dimethyl carbonate (DMC), opposite a lithium electrode weighing approximately 120 mg, displaying a surface of 2.5 cm$^2$.

A third lithium electrode is immersed in the solution, in proximity to the cathode, the potential of which will be used as a reference for measuring the electromotive force of the lithium/cathode material couple. Because the electrodes are isolated from each other in the solution, a separator is not needed.

Once the cell has been made in this manner, the experiment consists of applying a controlled potential to the cathode, which is measured with respect to the reference electrode, and registering the oxidation or reduction current which passes through it. The potential applied varies in a linear fashion as a function of time at the rate of 30 mV/mn, between predetermined limits.

Figure 5:
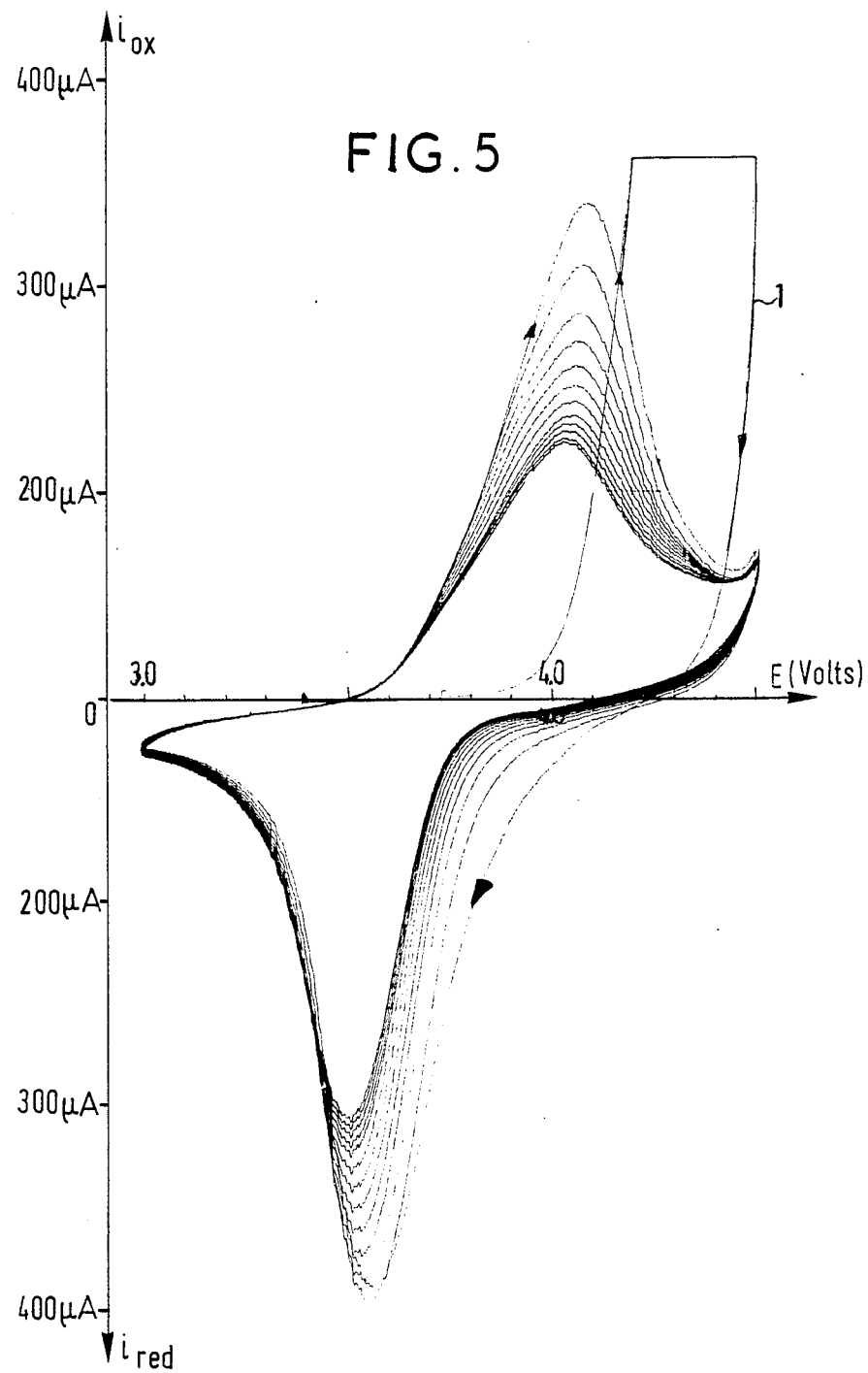
FIG. 5 is an intensity/potential diagram illustrating the reversibility of the cathode material according to the invention (curve A of FIG. 4), $LiNi_{0.91}Co_{0.09}O_2$.

FIG. 5 reproduces the intensity/potential diagram obtained in this manner. The potential E of the cathode in volts, measured relative to the reference lithium electrode, is shown along the x-axis; the oxidation current i$_{ox}$ (μA) and the reduction current i$_{red}$ (μ) passing through the cathode is shown along the y-axis.

This diagram clearly illustrates that the cathode under examination is reversible according to the reaction:

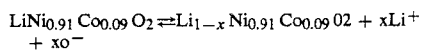

The oxidation range of the material lies between 3.5 and 4.5V and its reduction range between 4.2 and 3V.

The maximum currents of the oxidation and reduction peaks are:

I$_{red}$ max = 490 μA and i$_{ox}$ max = 440 μA.

For thin electrodes of this type, which contains small quantities of active material, the current may be related to the total quantity of the material, which is assumed to react at the same moment. Thus, in this instance, the maximum specific current j is such that:

j reduction = 942 mA/g j oxidation = 846 mA/g.

The first cycle (number 1 in FIG. 5) is an oxidation cycle, since the initial active material is in the reduced form, containing the lithium. It is noted that for the first cycle, the oxidation potential is higher than for subsequent cycles.

A third electrode which is similar to the second electrode according to the invention is prepared, using the compound LiNi$_{0.75}$Co$_{0.25}$O$_2$ prepared as in the foregoing (curve B of FIG. 4).

The experimental conditions are identical to those applied to the second electrode, with a mass of dry mixture equal to 3.7 mg.

Figure 6:
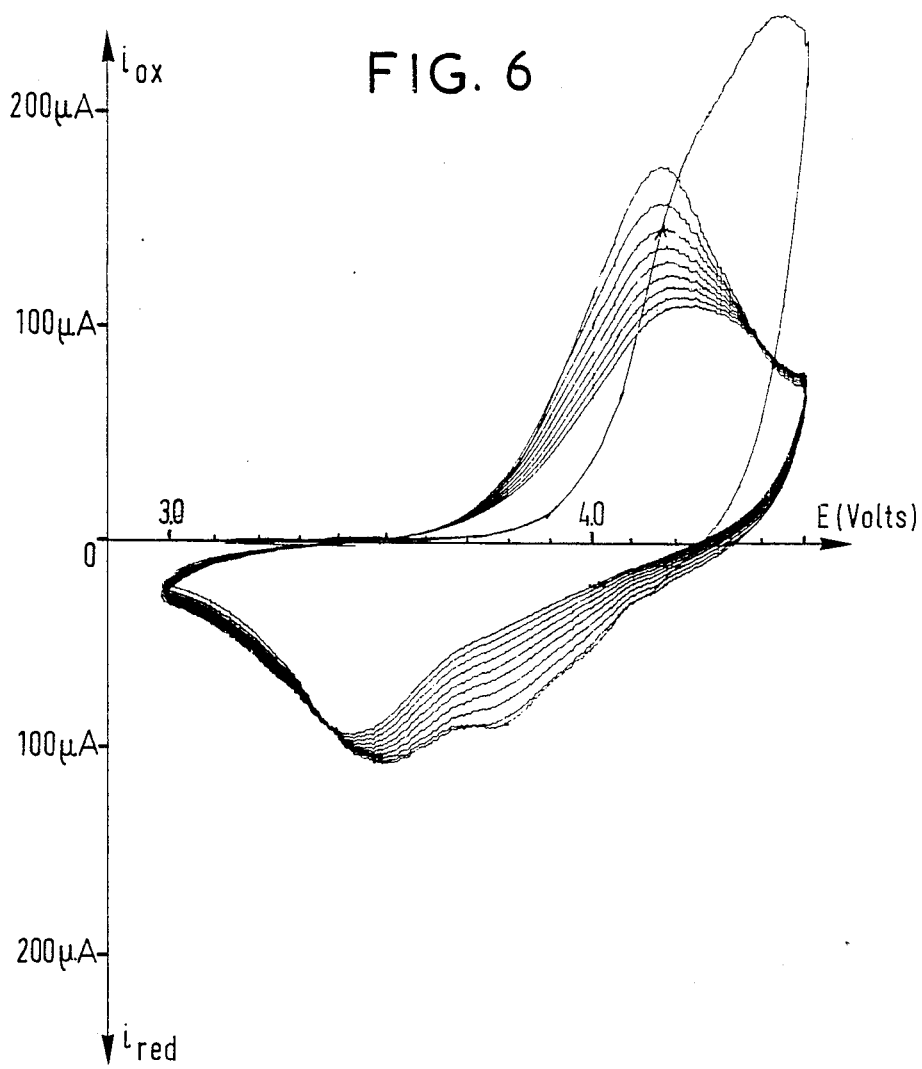
FIG. 6 is a diagram similar to that of FIG. 5 illustrating the reversibility of another cathode material according to the invention (curve B of FIG. 4), $LiNi_{0.75}Co_{0.25}O_2$.

This material is also reversible, as shown in the diagram of FIG. 6. However, the maximum reduction currents are lower than those of the preceding example, as shown in FIG. 5.

The specific current j$_{max}$ is such that:

j reduction = 270 mA/g and j oxidation = 486 mA/g.

The potentials of the maximum oxidation and reduction peaks are identical to those in the foregoing experiment.

EXAMPLE IV

A third sample of the material according to the invention of the formula LiNi$_{0.5}$Co$_{0.5}$O$_2$ is prepared using the same process as described in Examples II and III. A fourth electrode is then made from this material. The experimental conditions are identical, with a mass equal to 5.8 mg of dry mixture.

Figure 7:
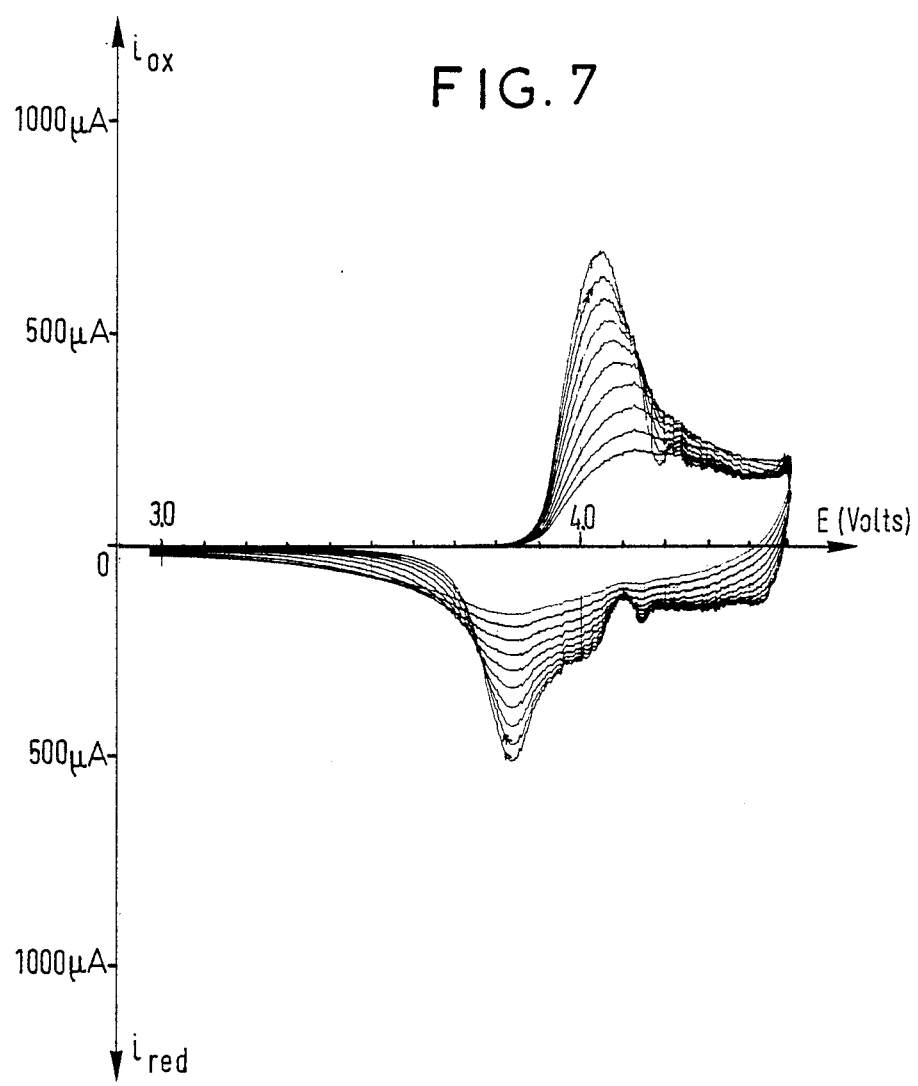
FIG. 7 is a diagram similar to that of FIGS. 5 and 6, illustrating the reversibility of a further material according to the invention, $LiNi_{0.5}Co_{0.5}O_2$.

It appears from this experiment, as shown in the diagram of FIG. 7, that this compound is also reversible, but the shape of the peaks and their position is very different.

The maximum specific currents are high:

j reduction = 862 mA/g; j oxidation = 1207 mA/g, but they decrease rapidly in the course of cycling.

An experimental battery is then made, consisting of a cathodic electrode of the same type as the second electrode tested (FIG. 5), but containing a higher proportion of active material. The proportions by weight are the following:

LiNi$_{0.91}$Co$_{0.09}$O$_2$ 30% graphite: 69% carboxymethyl cellulose: 1%

A quantity sufficient to produce 11.3 mg of dry mixture is deposited on an aluminum base, over an area of 1 cm$^2$, i.e. a quantity of cathode material equal to 3.4 mg.

This electrode is placed opposite a lithium electrode and separated therefrom by a microporous polypropylene membrane having a thickness of 50 microns. The two electrodes are firmly held against the separator by two insulated plates which have no effect in the electrochemical reaction.

This assembly is immersed in 5 ml of LiAsF$_6$ (2M) electrolyte in the DMC, within a hermetically sealed cell. Current outputs are provided for the application of current to the electrodes.

The lithium is present in a large quantity, in a capacity 500 times greater than the cathode capacity. It therefore does not limit the electrical properties of the battery.

The battery formed in this manner is subjected to charge-discharge cycles at an applied fixed current of 0.2 mA. This current is sufficiently high relative to the quantity of cathode material. The specific current is approximately 60 mA/g. This allows for valid testing of the kinetic properties of the material.

Figure 8A:
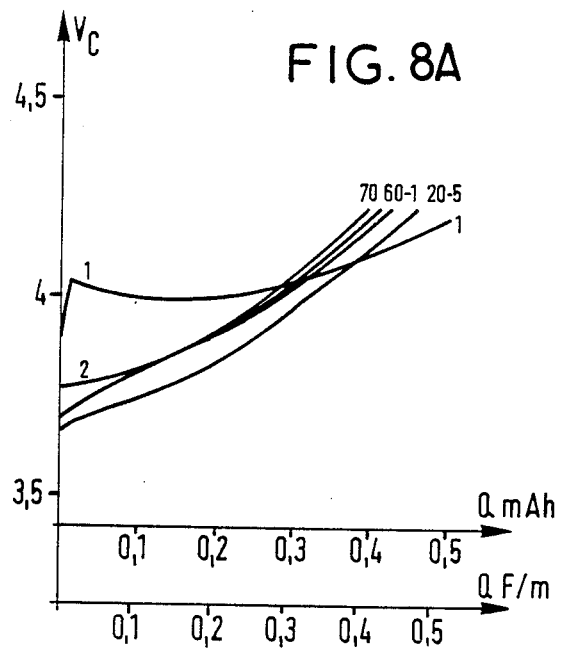
FIGS. 8a and 8B show the charge voltage $V_C$ and discharge voltage $V_D$ curves of an experimental battery according to the invention, over the course of one cycle.
Figure 8B:
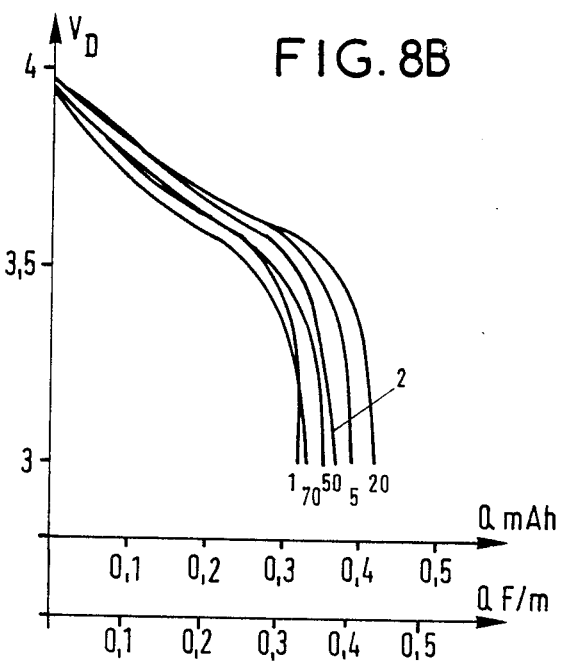

During these cycles, the voltage of the element is recorded. FIGS. 8a and 8b illustrate voltage curves $V_C$ (charge) and $V_D$ (discharge) as a function of the quantity of electric load Q applied, during the charge and discharge (Q is expressed in mAh and in Faraday/mole). The reference numbers denote the order of the cycles.

By measuring the quantities of electricity exchanged and the electromotive force of the couple, the curves provide a means of calculating the number of Faradays involved in the complete electrochemical reaction as well as the energy properties of the couple.

From this experiment, it was calculated that 0.44 F/mole were exchanged (cycle no. 20), or the following complete reaction:

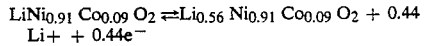

$$LiNi_{0.91}Co_{0.09}O_2 \rightleftharpoons Li_{0.56}Ni_{0.91}Co_{0.09}O_2 + 0.44 Li^+ + 0.44e^-$$

During discharge, the reduction reaction occurs at an average voltage of 3.7 V, or a specific energy released of 446 Wh/Kg, relative to the mass of cathode material.

Figure 9A:
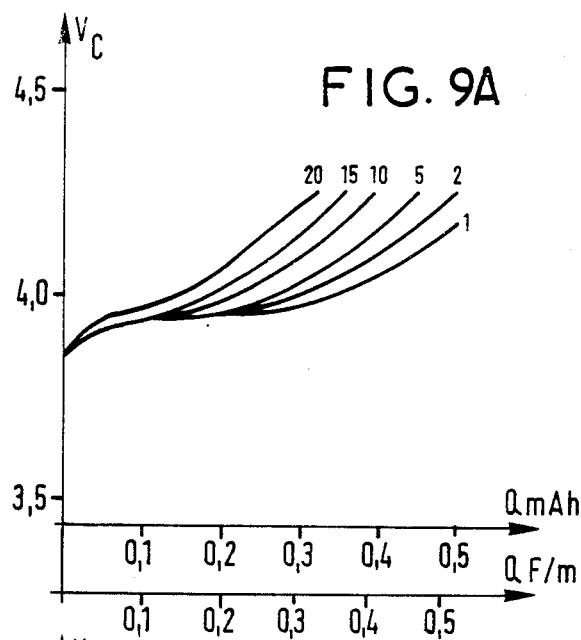
FIGS. 9a and 9b show curves similar to those of FIGS. 8a and 8b for a prior art material, $LiCoO_2$.
Figure 9B:
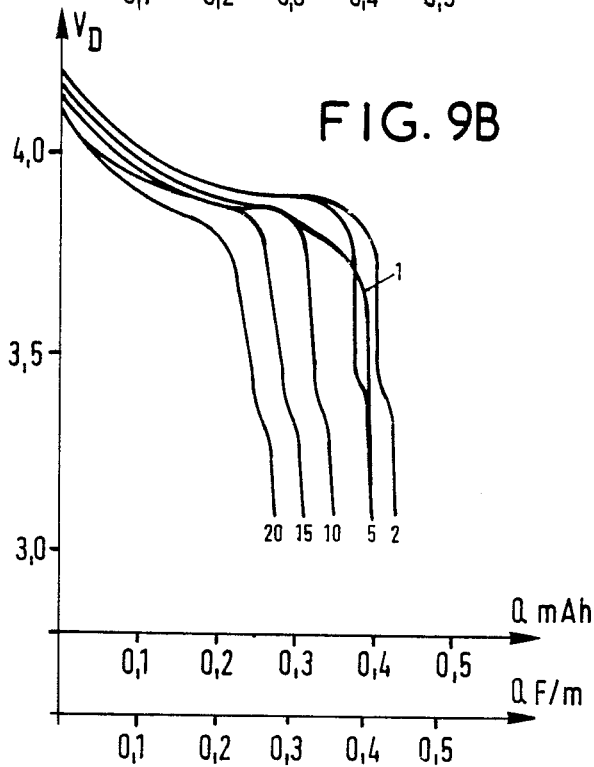

One highly advantageous characteristic of this material is the stability of the electric load applied over the course of cycling. This feature differentiates it from certain similar materials of the prior art, such as, for example, LiCoO$_2$ which is described in U.S. Pat. No. 7028-169-A. In this patent, an electrode containing 3.6 mg of LiCoO$_2$ was made, which is quite similar to the LiNi$_{0.91}$Co$_{0.09}$O$_2$ electrode, and tested under identical conditions. The cycling curves are shown in FIGS. 9a and 9b.

It is apparent that the capacity, which is identical to that of the material according to the invention at cycle no. 5, decreases more rapidly in the case of LiCoO$_2$ from the 5th to the 20th cycle.

The advantage of the material according to the invention is more clearly illustrated in the diagram of FIG. 10. The number of charge-discharge cycles n are shown along the x axis and the capacity C in Faradays/mole is shown along the y axis. Curve F corresponds to the prior art material LiCoO$_2$, while Curve E corresponds to the material according to the invention.

Of course, the invention is not limited to the embodiments described in the foregoing. More particularly, the lithium may be in the form of an alloy with other metals.

We claim:

1. A process for making a material that corresponds to one of the formulas Li$_y$Ni$_{2-y}$O$_2$ and LiNi$_{1-x}$Co$_x$O$_2$, where $0.084 \leq y \leq 1.22$ and $0.09 \leq x \leq 0.5$, the material being suitable for use as a cathode in an electrochemical cell having a lithium anode, wherein the process comprises:

(a) preparing a mixture in powdered form of stoichiometric amounts, in accordance with the desired ratio of lithium, nickel, and cobalt in the material, of lithium hydroxide and one of the group consisting of nickel oxide and a mixture of nickel oxide and cobalt oxide, and (b) heating the mixture prepared in step (a) in air at a temperature in the range from 600°C. to 800°C.

2. A process according to claim 1 wherein the lithium hydroxide used in step (a) is in the hydrated form, LiOH·H$_2$O.

3. A process according to claim 1 wherein step (b) comprises, in sequence:

heating the mixture in air at a temperature in the range from 600°C. to 800°C. for a first period of time;

homogenizing the mixture; and heating the mixture in air at a temperature in the same range for a second period of time.

4. A process according to claim 3 wherein the lithium hydroxide used in step (a) is in the hydrated form, LiOH·H$_2$O.

* * * * *